US006223243B1

(12) United States Patent
Ueda et al.

(10) Patent No.: US 6,223,243 B1
(45) Date of Patent: Apr. 24, 2001

(54) ACCESS CONTROL METHOD WITH PLURAL USERS HAVING I/O COMMANDS PRIORITIZED IN QUEUES CORRESPONDING TO PLURAL MEMORY UNITS

(75) Inventors: Youichi Ueda; Sukeyoshi Nakashima, both of Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/090,885

(22) Filed: Jun. 5, 1998

(30) Foreign Application Priority Data

Jun. 12, 1997 (JP) .................................................. 9-154620

(51) Int. Cl.$^{7}$ ..................................................... G06F 13/00

(52) U.S. Cl. ............................. 710/244; 710/40; 710/53; 710/240; 709/103; 709/240

(58) Field of Search .................................... 709/103, 240; 710/40, 53, 240, 244

(56) References Cited

U.S. PATENT DOCUMENTS 5,386,561 * 1/1995 Huynh et al. ....................... 709/103
5,530,871 * 6/1996 Abe ..................................... 710/244
5,699,521 * 12/1997 Iizuka et al. ......................... 709/240
5,844,980 * 12/1998 Patel et al. .......................... 379/266
5,845,116 * 12/1998 Saito et al. .......................... 709/103
5,966,730 * 10/1999 Zulch .................................. 711/162

FOREIGN PATENT DOCUMENTS

I
11989246664 * 10/1989 (JP) ............................... G06F/15/21
6-250792 9/1994 (JP) .

* cited by examiner

*Primary Examiner*—Thomas Lee
*Assistant Examiner*—Tammara Peyton
(74) *Attorney, Agent, or Firm*—Young & Thompson

(57) ABSTRACT

An access control apparatus, method, and recording medium for storing a program, provides equal input/output (IO) opportunities to auxiliary memory units for all users by attaching priority information for each user to user-entered IO commands. The prioritized IO commands are stored in an IO queue corresponding to a particular one of the auxiliary memory units, and physical IO is performed on each of the auxiliary memory units in the sequence of priority information attached to the prioritized IO commands in each IO queue irrespective of who the entrant users are.

4 Claims, 13 Drawing Sheets

[Fig. 1]
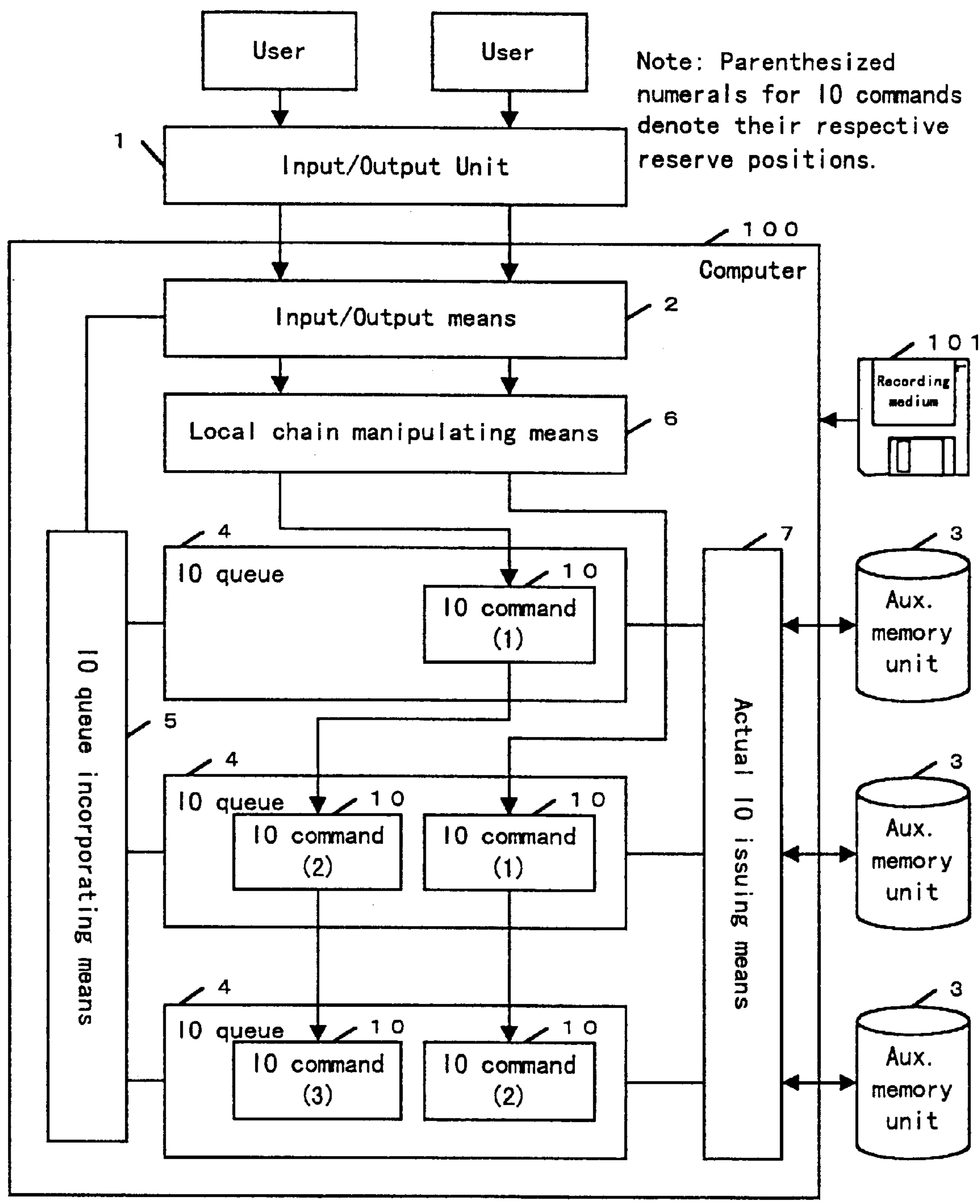

[Fig. 2]
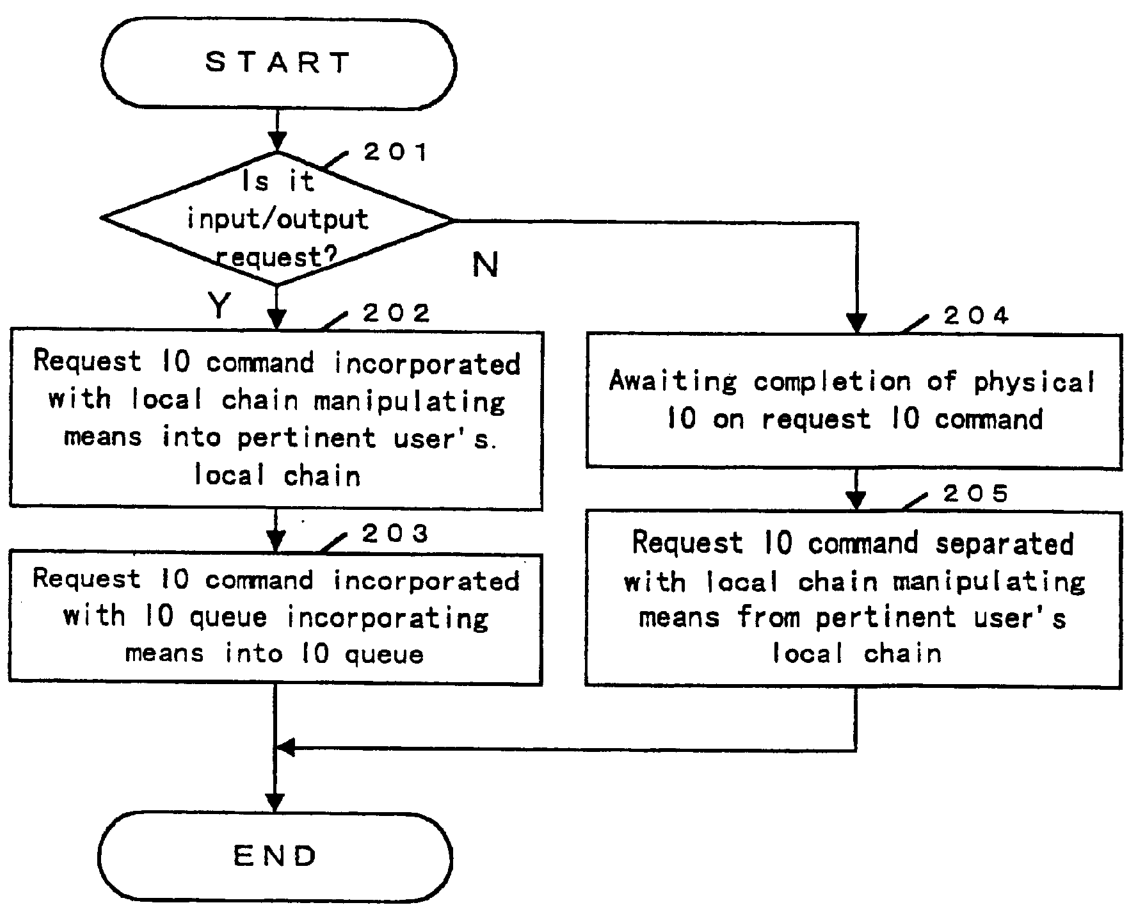

[Fig. 3]
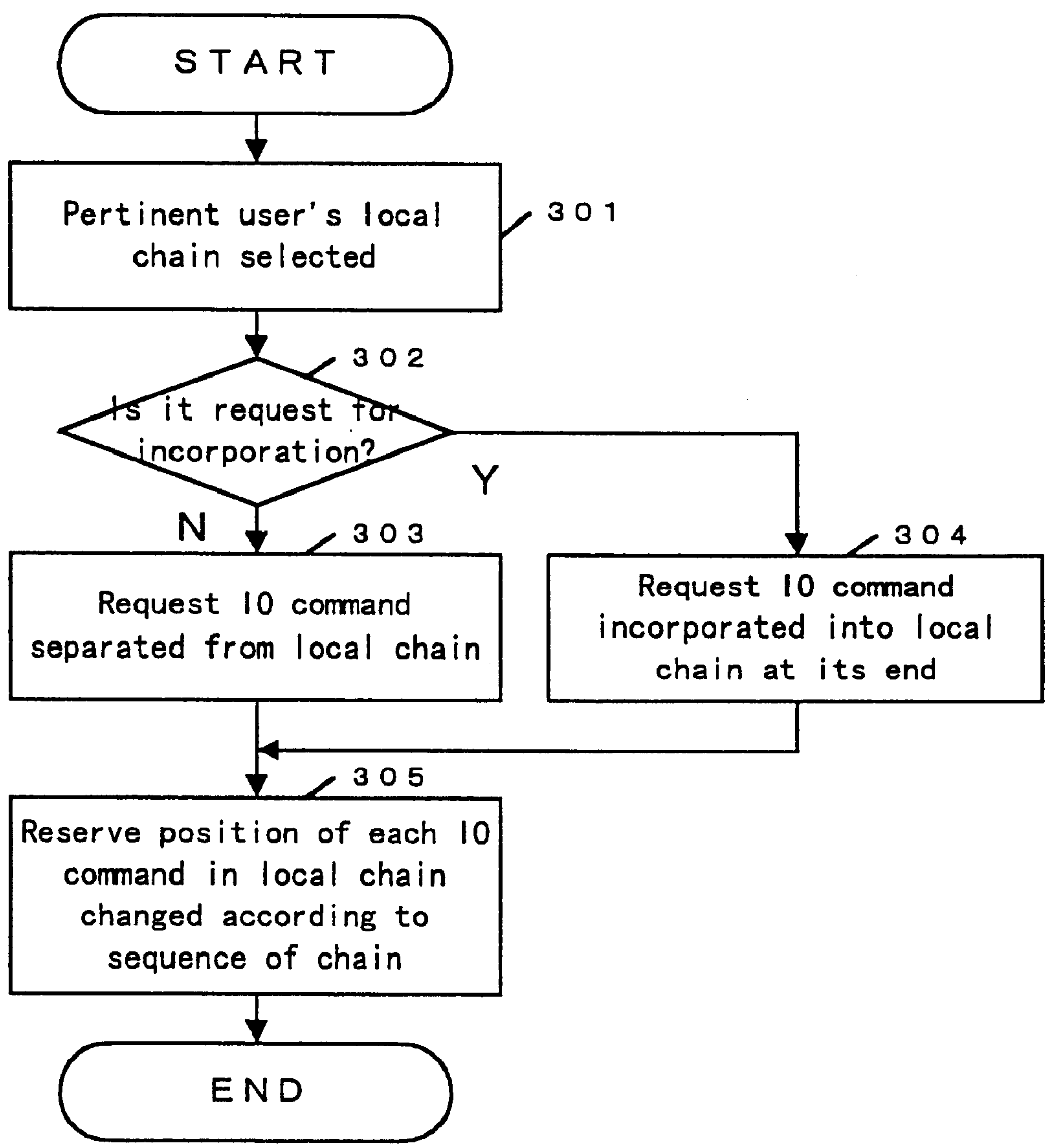

[Fig. 4]
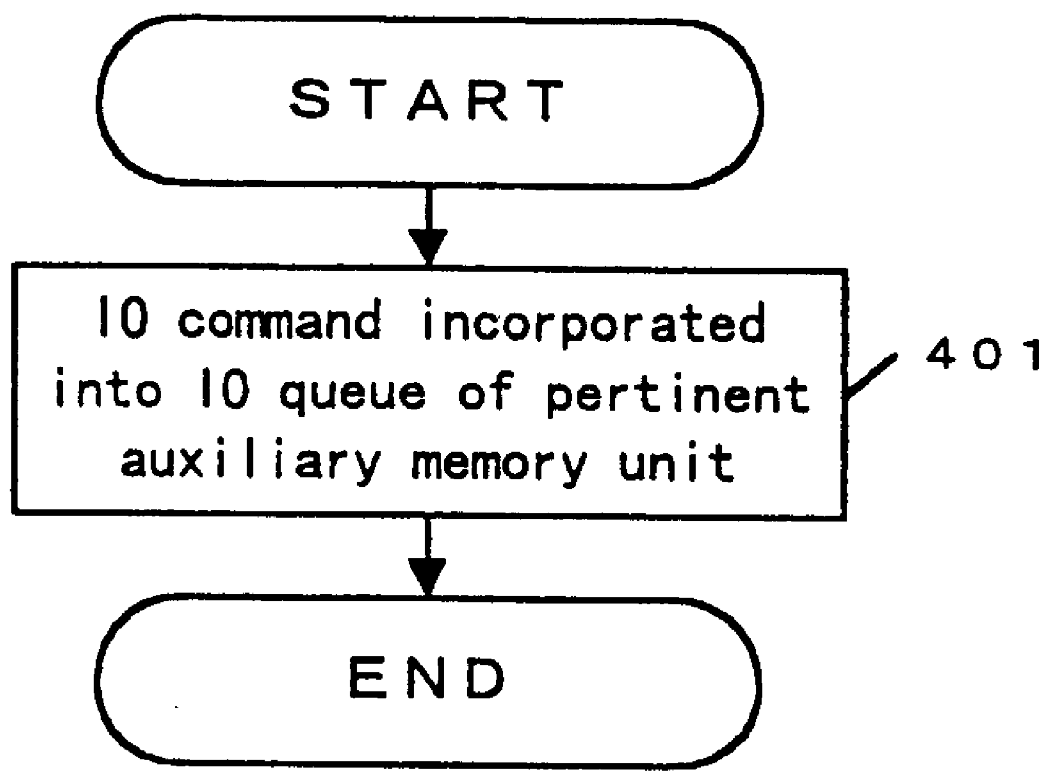

[Fig. 5]
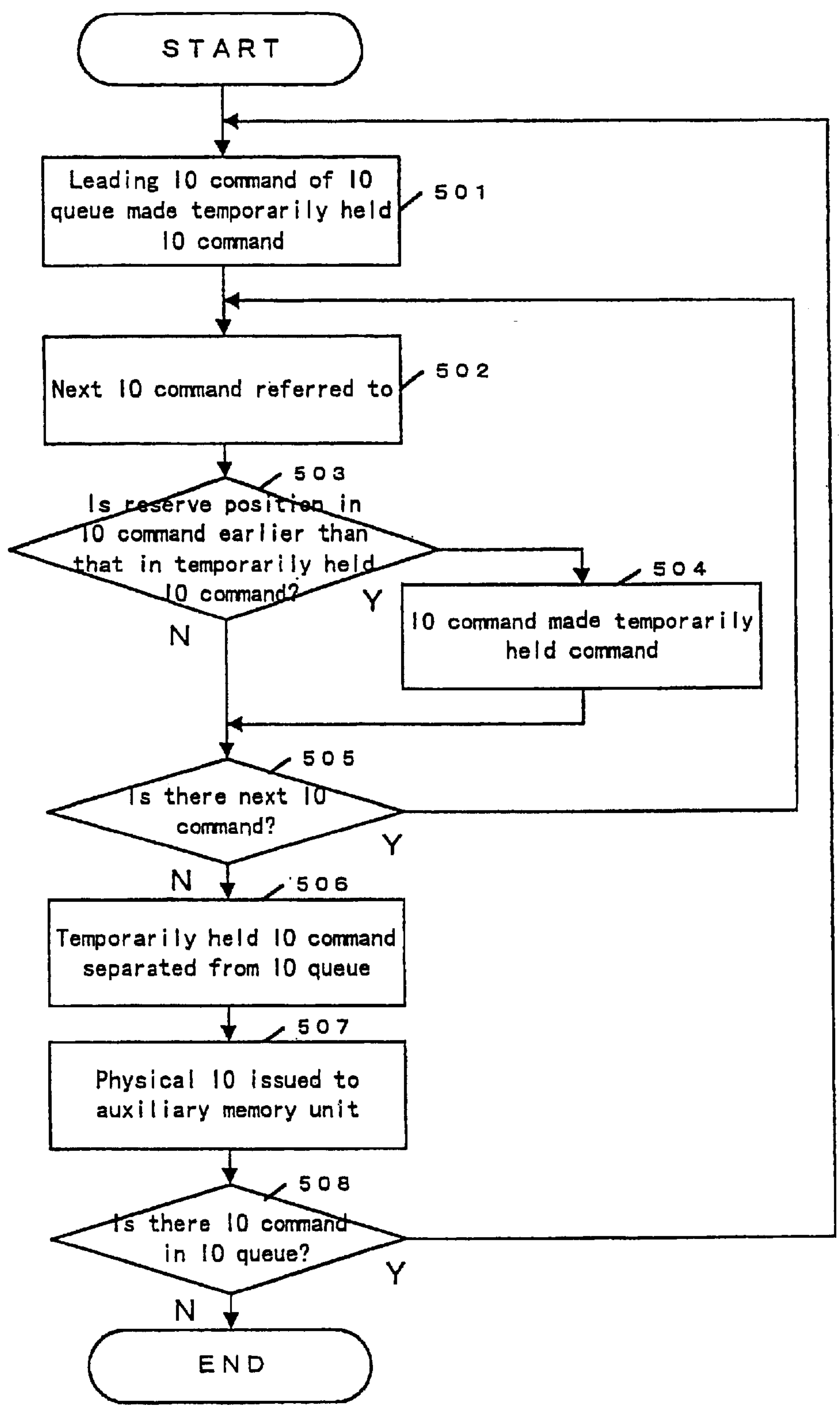

[Fig. 6]
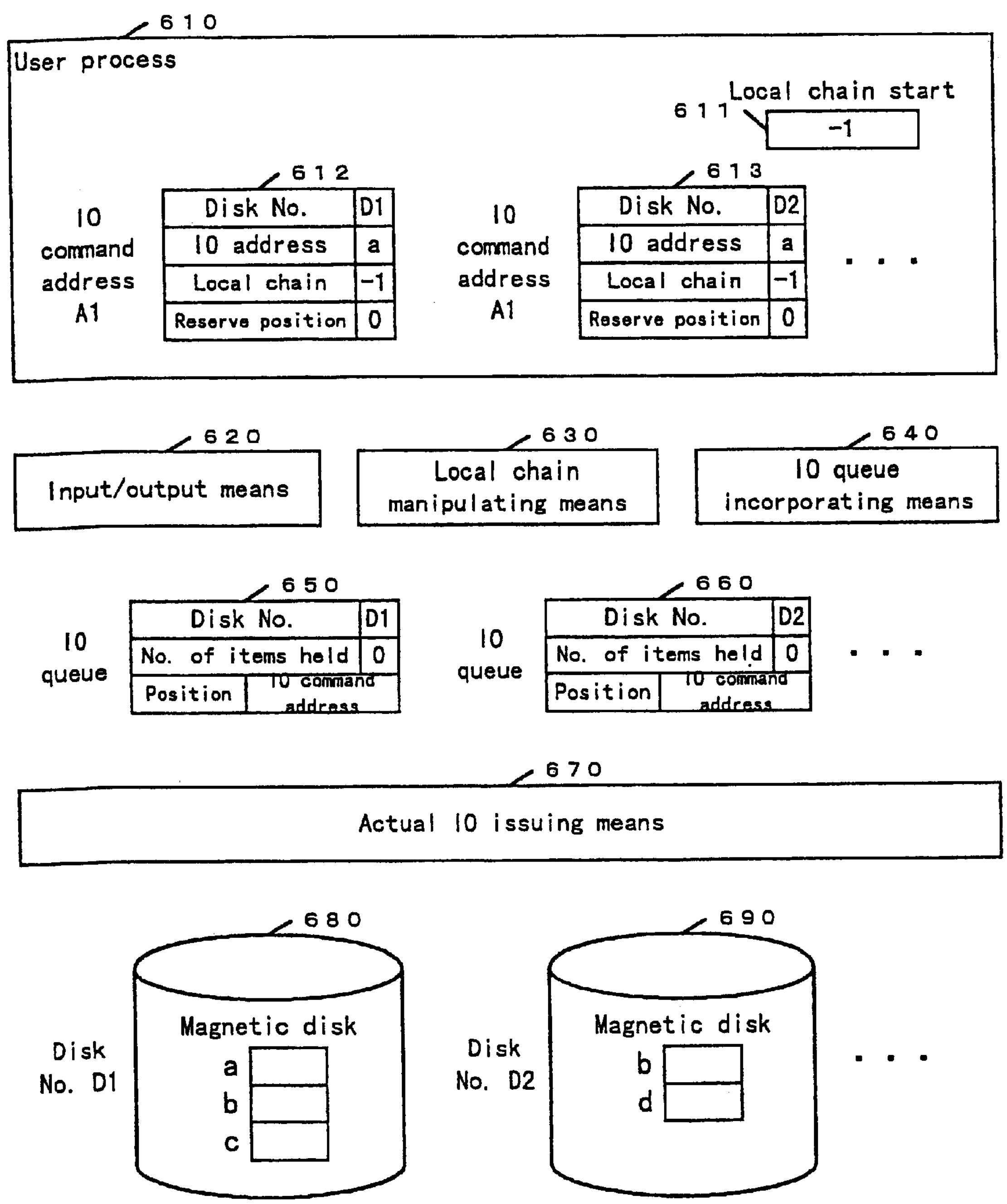

[Fig. 7]
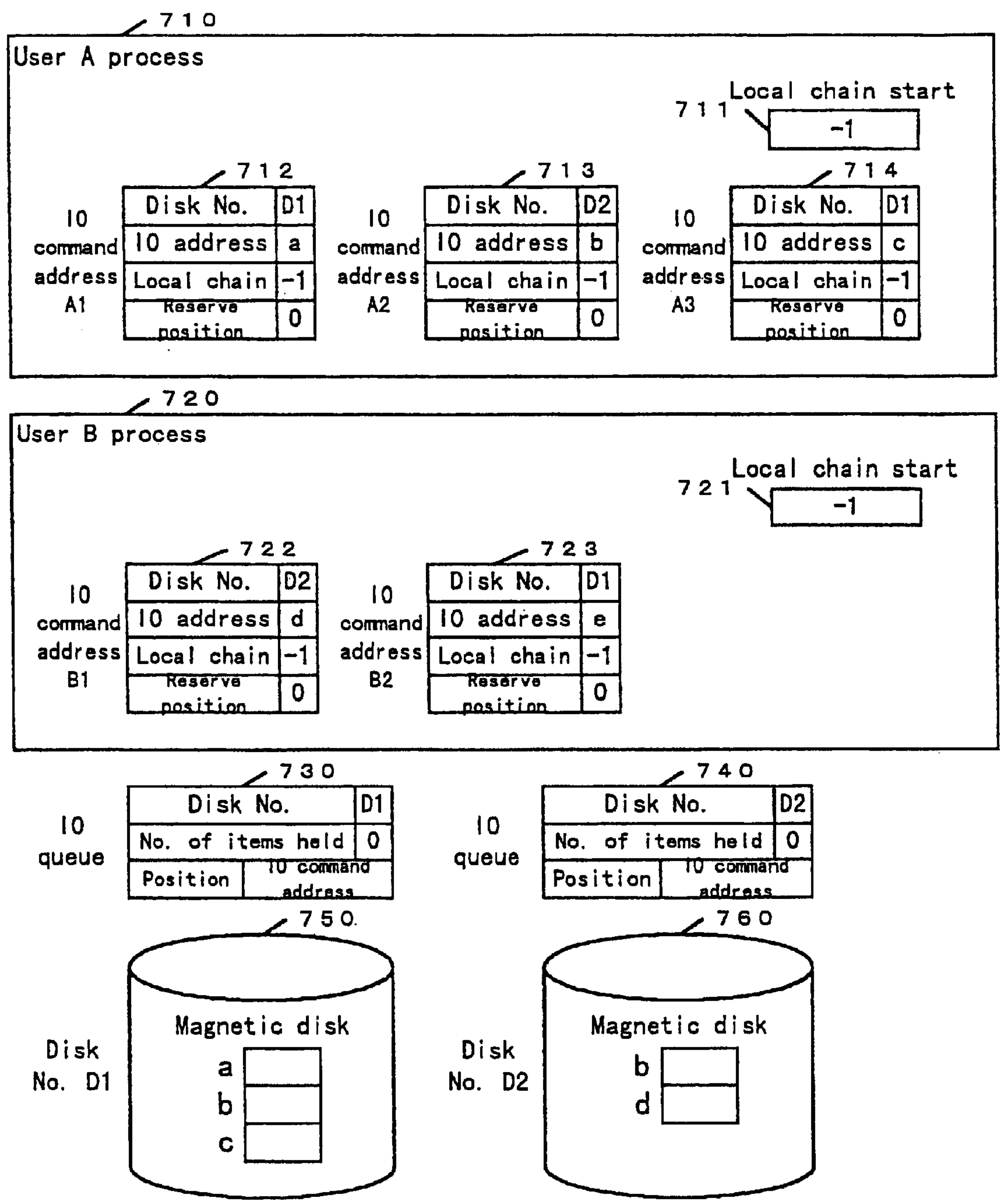

[Fig. 8]
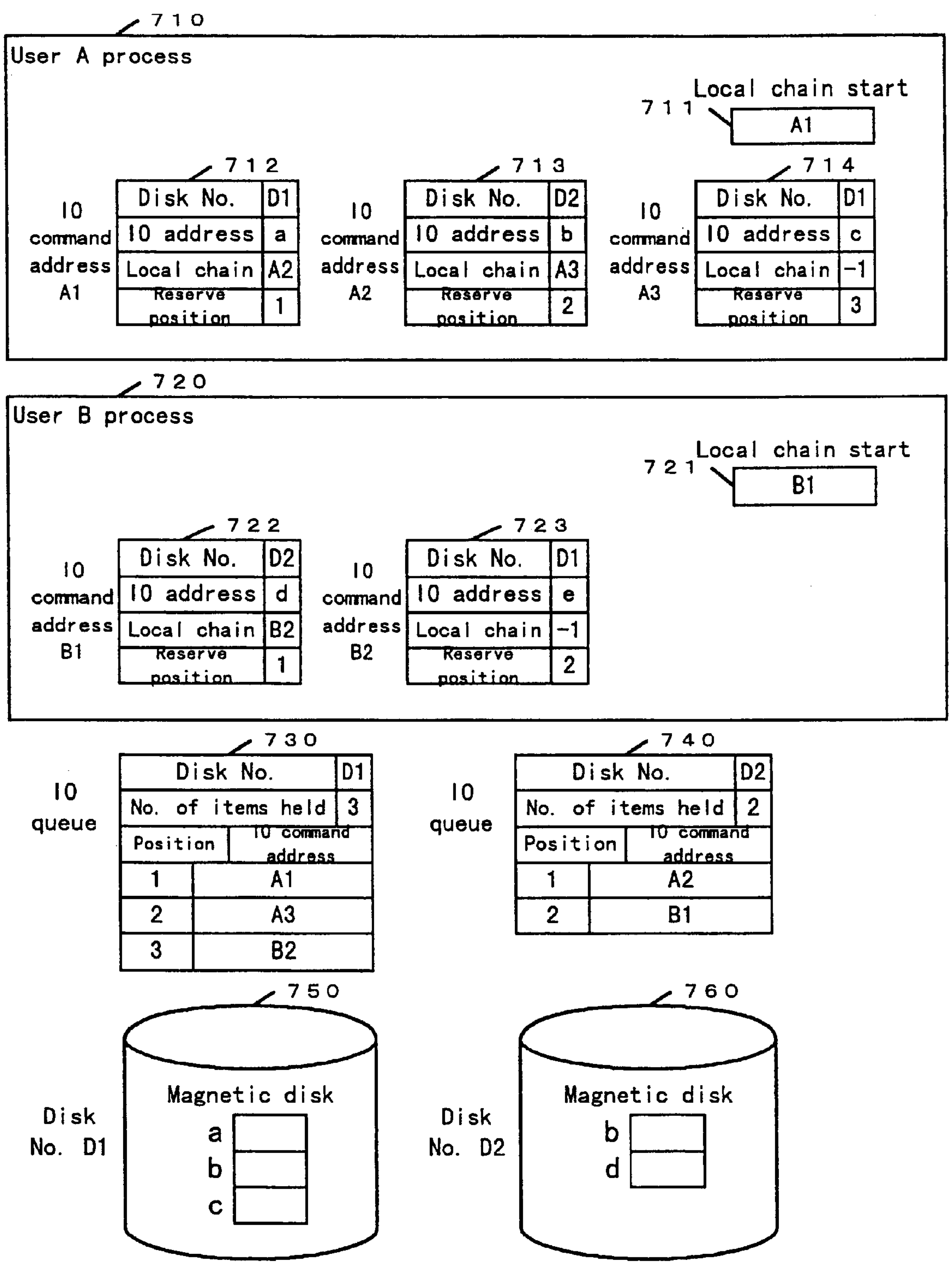

[Fig. 9]
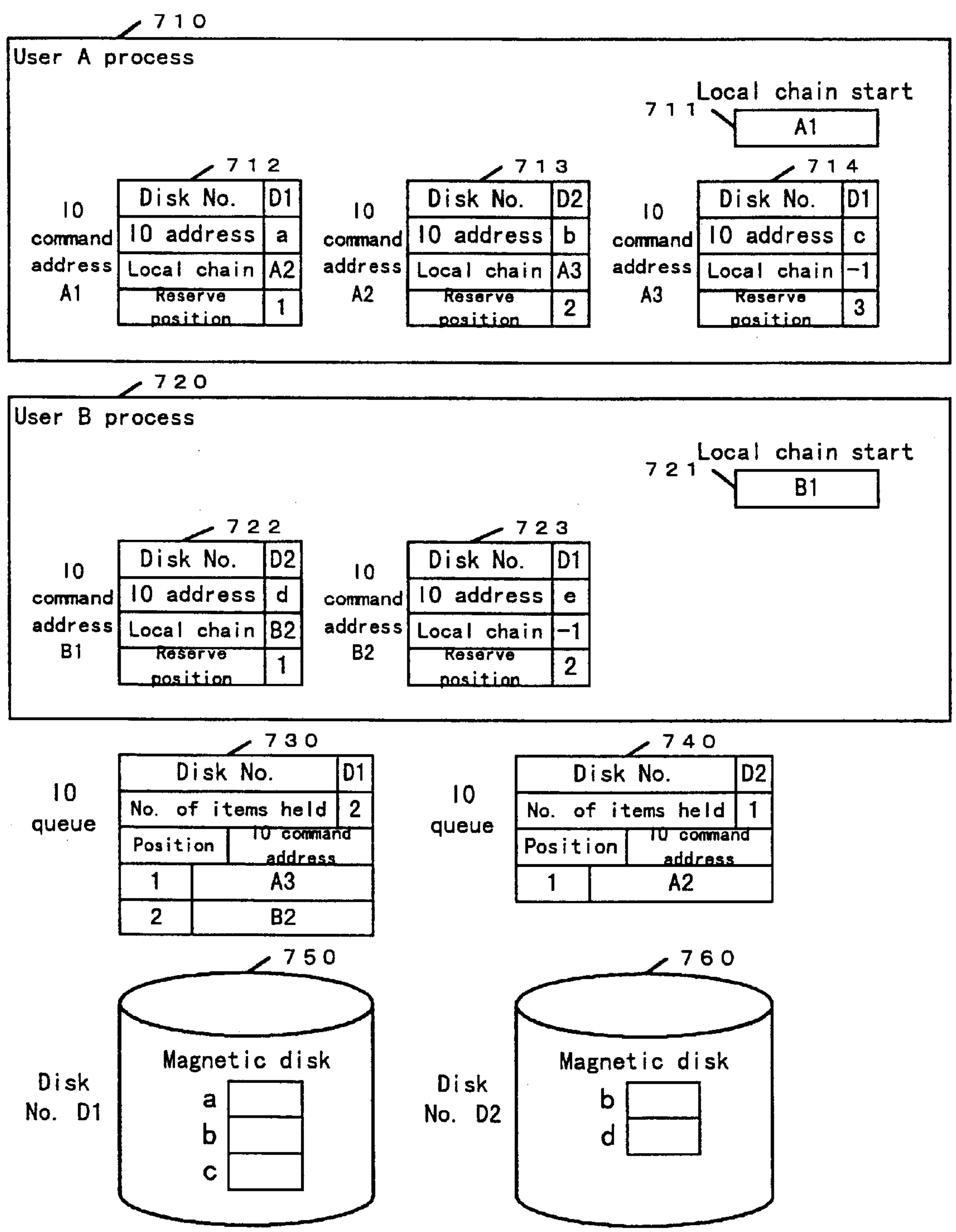

[Fig. 10]
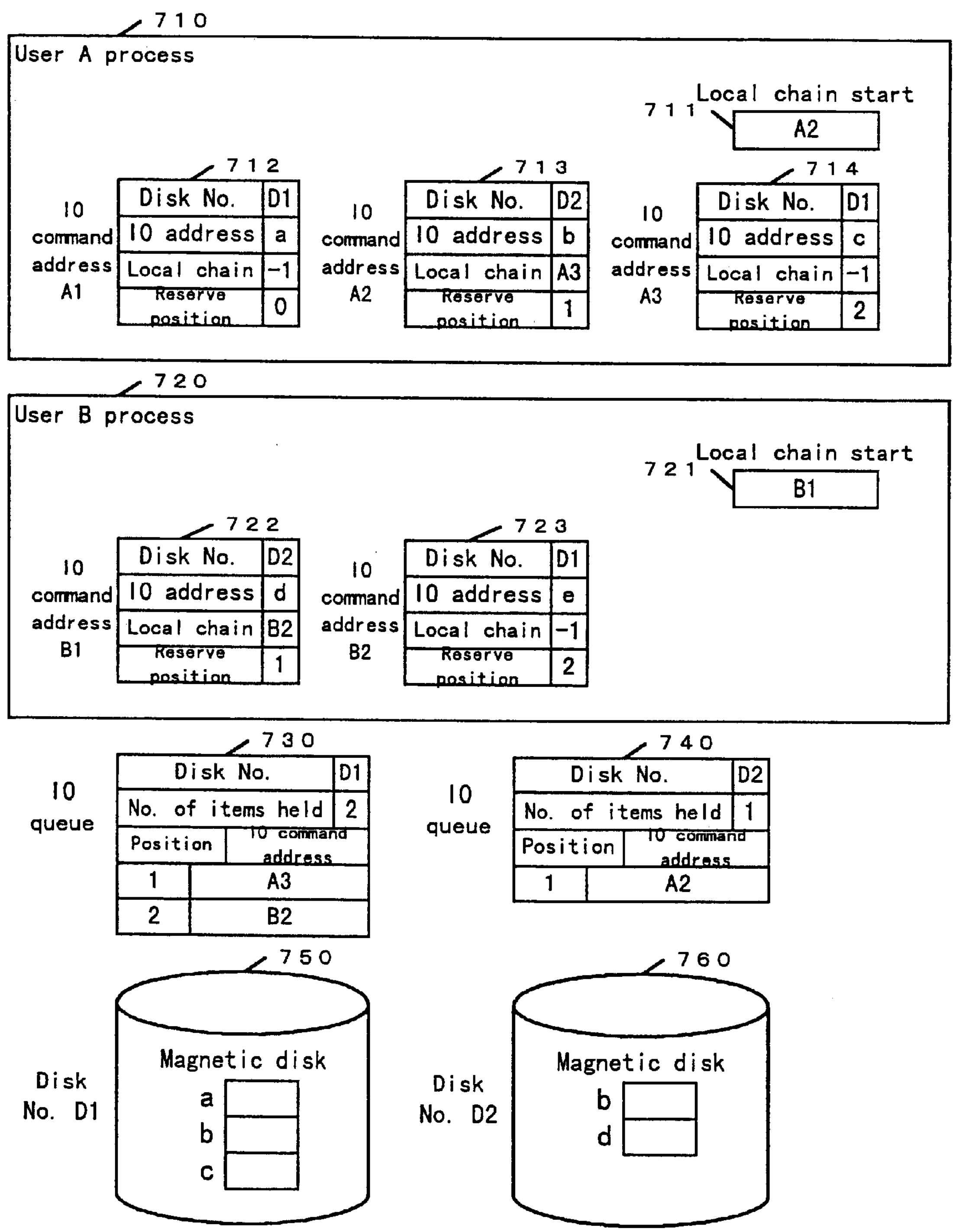

[Fig. 11]
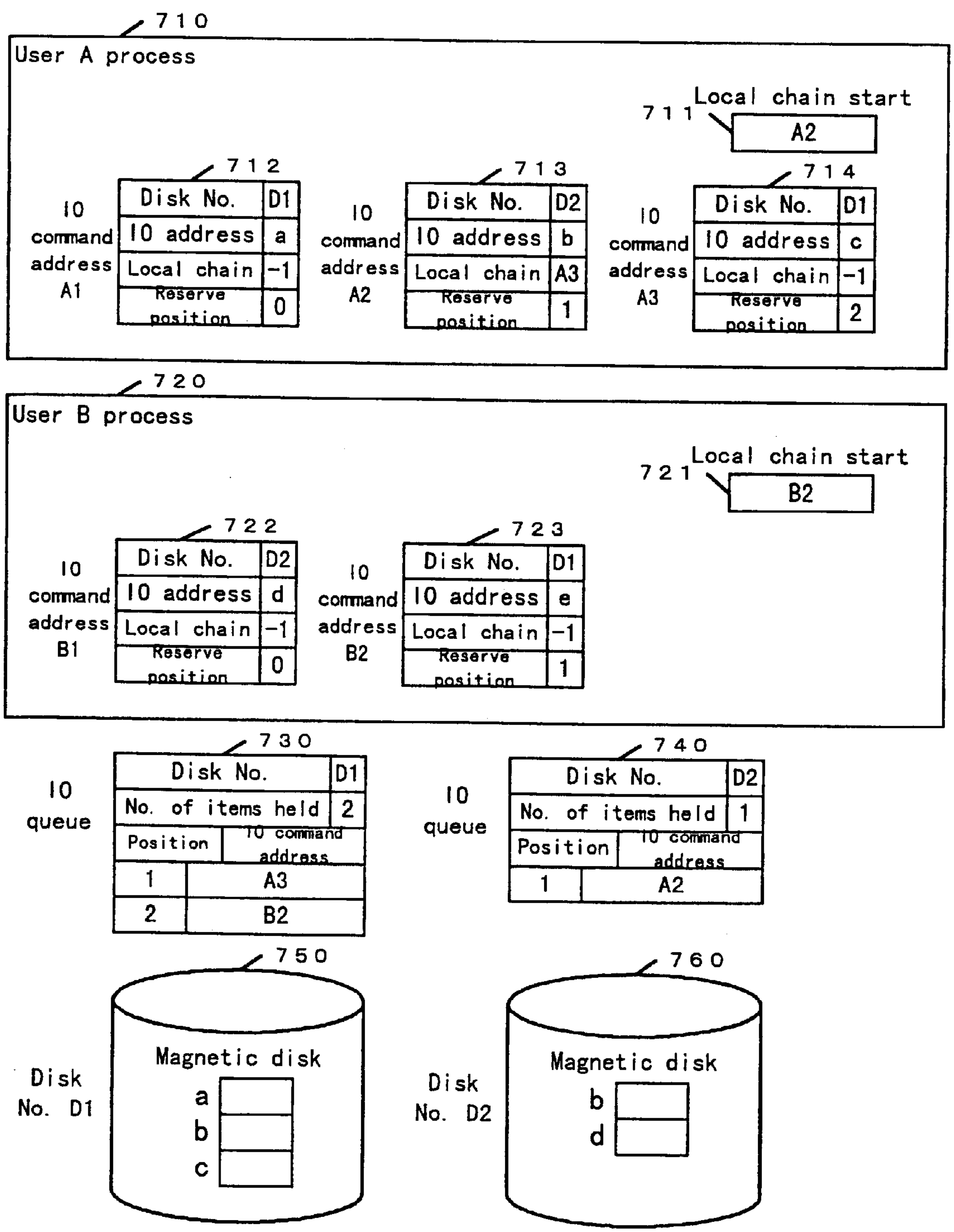

[Fig. 12]
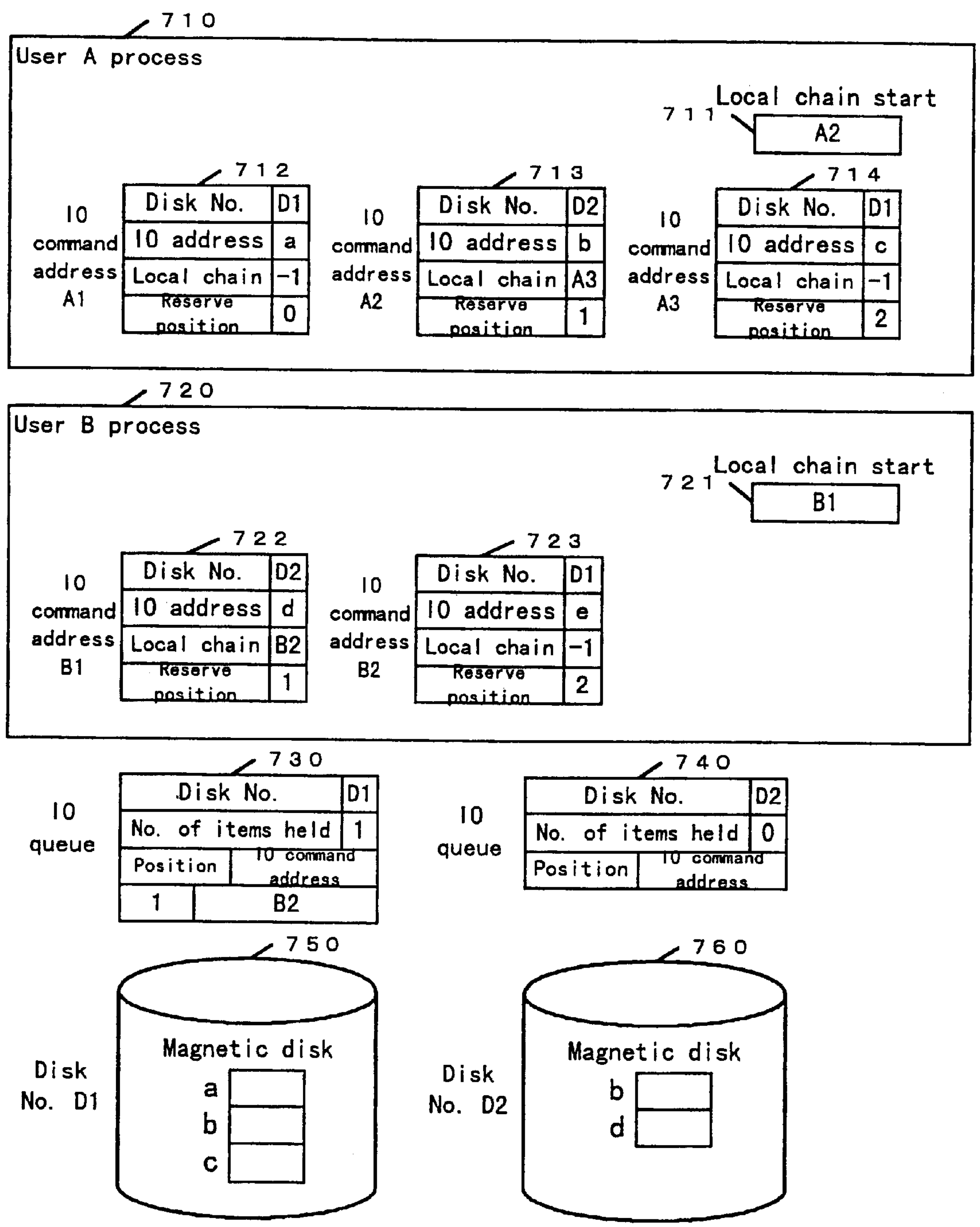

[Fig. 13]
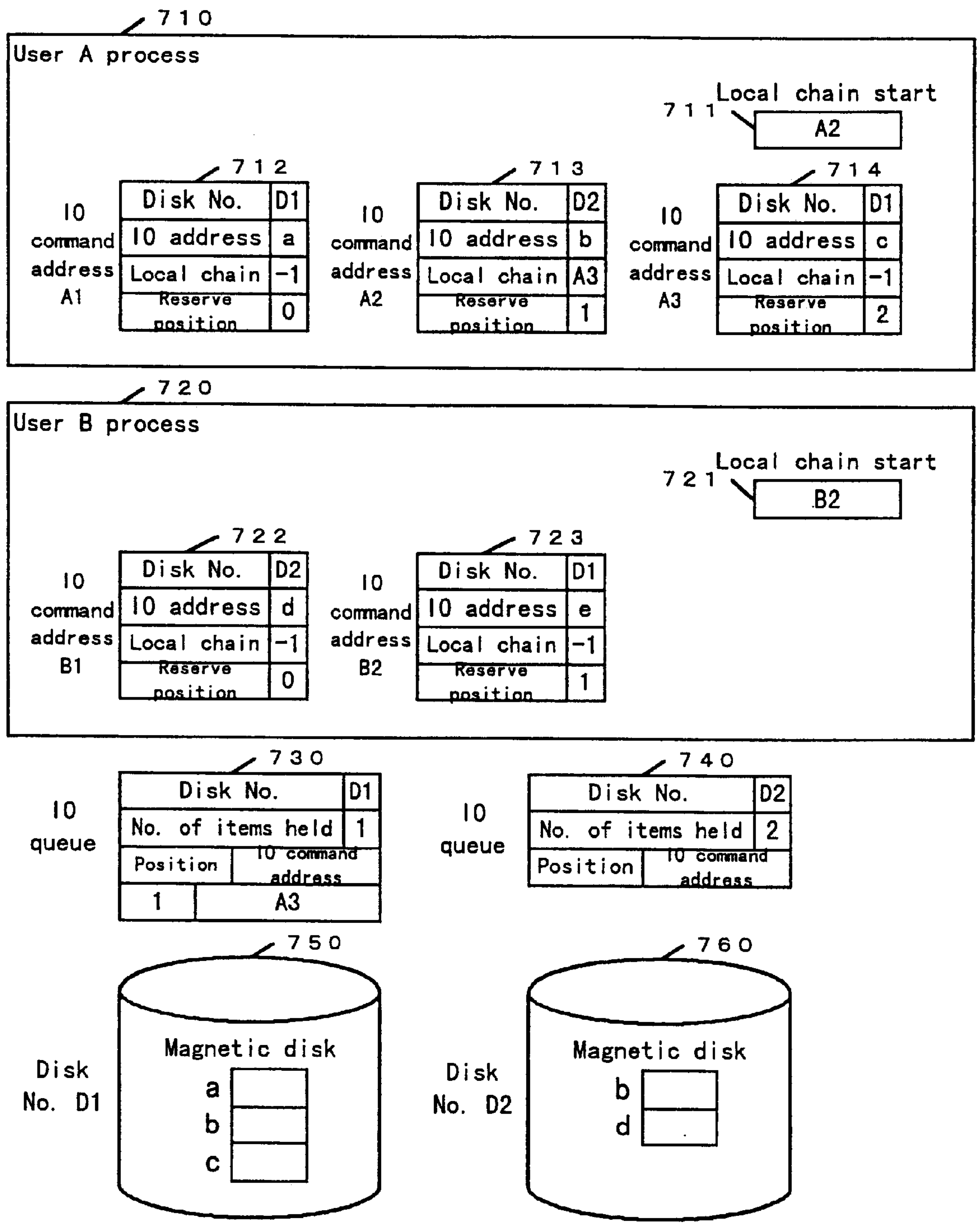

ACCESS CONTROL METHOD WITH PLURAL USERS HAVING I/O COMMANDS PRIORITIZED IN QUEUES CORRESPONDING TO PLURAL MEMORY UNITS

BACKGROUND OF THE INVENTION

1. Field of the Invention

The present invention relates to an access control apparatus for use by a plurality of users, wherein consecutive visual data for multimedia or video on demand (VOD) use are stored on a shared basis among a plurality of auxiliary memory units and, when a plurality of users try to access the data, every user is equally given an opportunity to access.

2. Description of the Related Art

In the Gazette of the Japanese Patent Laid Open No. Hei 6-250792, there is disclosed a file access control apparatus, which is a low speed device, capable of storing requests entered by a plurality of users for access to a file into a queue storing section and, if the access requests concern entry of data stored in the file, executing the entry process at the highest possible speed by inserting the input requests before output requests already stored in the queue storing section.

This prior art involves a problem that, because input requests for access to data in a file, entered by a plurality of users, are given priority in acceptance over output requests for data in that file, the performance of output processing is deteriorated.

It involves another problem that, as requests for accessing a file, entered by a plurality of users, are stored into a single queue storing section and processed in the sequence of their storage into the queue storing section (first come first served), the plurality of users are not given equal opportunities to access.

SUMMARY AND OBJECTS OF THE INVENTION

An object of the present invention is to provide an access control apparatus capable of giving requests for accessing a file, entered by a plurality of users, equal opportunities to access and executing their processing efficiently.

An access control apparatus according to a first aspect of the invention consists of IO queue incorporating means for attaching priority information for each user entering an input/output command to an auxiliary memory unit, and storing the command into an IO queue corresponding to the auxiliary memory unit; and actual IO issuing means for taking out such input/output commands, stored in said IO queue, in the sequence of priority information attached thereto irrespective of who the entrant users are and executing the commands on the auxiliary memory unit corresponding to the IO queue.

An access control apparatus according to a second aspect of the invention consists of local chain manipulating means for adding an input/output command to an auxiliary memory unit, entered by a user, to the end of the local chain of the user; IO queue incorporating means for storing said input/output command into an IO queue corresponding to an auxiliary memory unit designated by that input/output command; and actual IO issuing means for taking out such input/output commands, stored in said IO queue, in accordance with the respective priority positions of the input/output commands in said local chain irrespective of who the entrant users are and executing the taken-out input/output commands on the auxiliary memory unit corresponding to the IO queue.

An access control apparatus according to a third aspect of the invention, is a version of the access control apparatus according to the second aspect of the invention, wherein said local chain manipulating means further deletes, in response to a request entered by a user for confirmation of input/output completion on an input/output command, the input/output command from said local chain of that user after confirming the completion of the execution of the input/output command.

An access control method according to the first aspect of the invention includes an IO queue incorporating step to attach priority information for each user entering an input/output command to an auxiliary memory unit, and to store the command into an IO queue corresponding to the auxiliary memory unit; and an actual IO issuing step to take out such input/output commands, stored into said IO queue at said IO queue incorporating step, in the sequence of priority information attached thereto irrespective of who the entrant users are and to execute the commands on the auxiliary memory unit corresponding to the IO queue.

An access control method according to the second aspect of the invention includes a local chain manipulating step to add a user-entered input/output command to an auxiliary memory unit to the end of the local chain of the user; an IO queue incorporating step to store said input/output command into an IO queue corresponding to an auxiliary memory unit designated by that input/output command; and an actual IO issuing step to take out such input/output commands, stored into said IO queue at said IO queue incorporating step, in accordance with the respective priority positions of the input/output commands in said local chain irrespective of who the entrant users are, and to execute the taken-out input/output commands on the auxiliary memory unit corresponding to the IO queue.

An access control method according to a third aspect of the invention, is a version of the access control method according to the second aspect of the invention, wherein said local chain manipulating step further includes deletion, in response to a request entered by a user for confirmation of input/output completion on an input/output command, of the input/output command from said local chain of that user after confirming the completion of the execution of the input/output command.

A recording medium according to the first aspect of the invention records a program to cause a computer to execute IO queue incorporation processing to attach priority information for each user to a user-entered input/output command to an auxiliary memory unit, and to store the command into an IO queue corresponding to the auxiliary memory unit; and actual IO issue processing to take out such input/output commands, stored into said IO queue by said IO queue incorporation processing, in the sequence of priority information attached thereto irrespective of who the entrant users are and to execute the commands on the auxiliary memory unit corresponding to the IO queue.

A recording medium according to the second aspect of the invention records a program to cause a computer to execute local chain manipulation processing to add a user-entered input/output command to an auxiliary memory unit, to the end of the local chain of the user; IO queue incorporation processing to store said input/output command into an IO queue corresponding to an auxiliary memory unit designated by that input/output command; and actual IO issue processing to take out such input/output commands, stored into said IO queue by said IO queue incorporation processing, in accordance with the respective priority positions of the input/output commands in said local chain irrespective of who the entrant users are and to execute the taken-out input/output commands on the auxiliary memory unit corresponding to the IO queue.

A recording medium according to a third aspect of the invention, is a version of the recording medium according to the second aspect of the invention, wherein said program, in said local chain manipulation processing, further causes, in response to a request entered by a user for confirmation of input/output completion on an input/output command, the input/output command to be deleted from said local chain of that user after confirming the completion of the execution of the input/output command.

A group of recording media according to the first aspect of the invention divide said program, recorded in any one of the recording media according to the first to third aspects of the invention, into a plurality of segments, and record each of the plurality of segments in one or another of the plurality of recording media.

BRIEF DESCRIPTION OF THE DRAWINGS

The present invention will be understood more fully from the detailed description given below and from the accompanying drawings of preferred embodiments of the invention, which, however, should not be regarded as limiting the invention, but are merely intended to help explain, and facilitate understanding of, the invention.

FIG. 1 is a block diagram illustrating a mode of implementation of the invention.

FIG. 2 is a flow chart illustrating the operation of the input/output means 2 in this mode of implementation of the invention.

FIG. 3 is a flow chart illustrating the operation of the local chain manipulating means 6 in this mode of implementation of the invention.

FIG. 4 is a flow chart illustrating the operation of the IO queue incorporating means 5 in this mode of implementation of the invention.

FIG. 5 is a flow chart illustrating the operation of the actual IO issuing means 7 in this mode of implementation of the invention.

FIG. 6 is a block diagram of a preferred embodiment of the invention.

FIG. 7 is a diagram illustrating the state of the preferred embodiment of the invention before user A and user B request input/output processing.

FIG. 8 is a diagram illustrating the state of the preferred embodiment of the invention after user A and user B have requested input/output processing.

FIG. 9 is a diagram illustrating the state of the preferred embodiment of the invention after the completion of physical IO.

FIG 10 is a diagram illustrating the state of the preferred embodiment of the invention after user A has confirmed the completion of input/output.

FIG. 11 is a diagram illustrating the state of the preferred embodiment of the invention after user B has confirmed the completion of input/output.

FIG. 12 is a diagram illustrating the state after physical IO has been performed in the state of FIG. 10.

FIG. 13 is a diagram illustrating the state after physical IO has been performed in the state of FIG. 11.

Here, it should be noted that like reference numerals represent like elements throughout the disclosure.

DETAILED DESCRIPTION OF THE PREFERRED EMBODIMENTS

A mode of implementation of the present invention will be described in detail below with reference to the drawings.

Referring to FIG. 1, a mode of implementation of the invention is configured of a computer 100 operating under programmed control; input/output units 1, connected to the computer 100, into which users enter input/output requests or confirmations of input/output completion; and auxiliary memory units 3.

In a variation of this mode of implementation, the computer 100 and a recording medium 101 such as a magnetic disk unit or a semiconductor memory may be connected to each other via a signal line, so that the computer 100 executes the following processing under a program loaded from the recording medium 101 via the signal line.

The computer 100 comprises input/output means 2 for receiving input/output requests or confirmations of input/output completion entered by users; IO queues 4 for holding input/output requests, each corresponding to one or another of the auxiliary memory units 3; IO queue incorporating means 5 for incorporating into one or another of the IO queues 4 an IO command 10 holding the reserve position of a user's input/output request and the user's local chain; local chain manipulating means 6 for manipulating reserve positions in IO commands 10 and local chains; and actual IO issuing means 7 for taking out IO commands 10 from IO queues 4 and processing physical input/output (physical IO) upon auxiliary memory units 3.

FIG. 2 is a flow chart which illustrates processing by the input/output means 2; FIG. 3 is a flow chart which illustrates processing by the local chain manipulating means 6; FIG. 4 is a flow chart which illustrates processing by the IO queue incorporating means 5; and FIG. 5 is a flow chart which illustrates processing by the actual IO issuing means 7.

Next, the overall operation of this mode of implementation will be described in detail below with reference to FIGS. 1 to 5.

First will be described a case in which a user makes an input/output request by entering an IO command 10 at an input/output unit 1.

Referring to FIG. 1, the input/output means 2 determines whether the user's request entered into the input/output unit 1 is an input/output request or a confirmation of input/output completion (step 201) and, if it is determined to be an input/output request, incorporates with the local chain manipulating means 6 the IO command 10 into the user's local chain (step 202).

The input/output means 2, with the IO queue incorporating means 5, further incorporates the IO command 10 into the IO queue 4 corresponding to a designated auxiliary memory unit 3 (step 203), and completes the processing.

If the user's request is determined to be a confirmation of input/output completion at step 201, the input/output means 2 waits until physical IO on the IO command 10, whose input/output completion is to be confirmed, is completed (step 204) and, upon completion of the input/output processing, separates with the local chain manipulating means 6 the IO command 10 from the user's local chain (step 205), thereby completing the processing.

Referring to FIG. 3, the local chain manipulating means 6, as instructed by the input/output means 2, picks out the local chain of the user having requested input/output (step 301), determines whether the instruction by the input/output means 2 requires incorporation of the IO command 10 into the local chain or its separation from the local chain (step 302) and, if it is determined to be a request for separation, separates the IO command 10 from the local chain (step 303) or, if it is determined to be a request for incorporation, adds the IO command 10 at the end of the local chain (step 304).

The local chain manipulating means 6 further alters the reserve position of the IO command 10 in the local chain according to the sequence of the chain (step 305), and completes the processing.

Referring to FIG. 4, the IO queue incorporating means 5, as instructed by the input/output means 2, incorporates the IO command 10 into the IO queue 4 corresponding to the auxiliary memory unit 3 designated by the input/output request (step 401), and completes the processing.

Referring to FIG. 5, the actual IO issuing means 7 temporarily holds the leading one of the IO commands 10 stored in the IO queue 4 corresponding to an auxiliary memory unit 3 (step 501), compares the reserve position of the temporarily held IO command with that of the following IO command 10, temporarily holds whichever of the IO commands 10 is earlier in the reserve position, and repeats this procedure on every IO command 10 stored in the IO queue 4 (steps 502 to 505). The actual IO issuing means 7, after the completion of step 505, separates the temporarily held IO command from the IO queue 4 (step 506), and performs physical 10 corresponding to the temporarily held IO command on the auxiliary memory unit 3 (step 507). The actual IO issuing means 7 repeats physical IO on the auxiliary memory unit 3 as long as any IO command 10 is stored in the IO queue 4 (step 508). The actual IO issuing means 7 performs the above-described processings of steps 501 to 508 for IO queues 4 corresponding to all the auxiliary memory units 3.

Preferred Embodiment

Next will be described in detail a preferred embodiment of the invention with reference to FIGS. 6 to 13.

FIG. 6 is a block diagram of the preferred embodiment of the invention, consisting of a user process 610; input/output means 620 for receiving input/output requests and confirmations of input/output completion entered by users; a plurality of magnetic disk units 680 and 690 for storing data; an IO queue 650 for holding an IO command 612 correspondingly to the magnetic disk unit 680; an IO queue 660 for holding the address of an IO command 613 correspondingly to the magnetic disk unit 690; IO queue incorporating means 640 for incorporating the IO commands 612 and 613 into the IO queues 650 and 660, respectively; local chain manipulating means 630 for manipulating the reserve positions of the IO commands 612 and 613 and a local chain; and actual IO issuing means 670 for taking out the IO commands 612 and 613 from the IO queues 650 and 660, respectively, and performing physical inputting/outputting. Each individual user process 610 comprises the IO commands 612 and 613 for holding the reserve positions of input/output requests and the local chain, and a local chain start 611 for storing the address of the leading IO command of the local chain.

The IO command 612 comprises the disk number of the magnetic disk unit 680 for performing physical inputting/outputting; an IO address, which is the address of the object of inputting/outputting in the magnetic disk unit 680; the local chain for chaining the IO command 612 in the user process; and a reserve position indicating the position of the input/output request in the reserve sequence. Similarly, the IO command 613 comprises the disk number of the magnetic disk unit 690; an IO address, which is the address of the object of inputting/outputting in the magnetic disk unit 690; the local chain for chaining the IO command 613; and a reserve position.

The IO queue 650 is provided with the disk number of the magnetic disk 680; the number of held items, which is the number of input/output requests in the IO queue; the IO command address of the IO command 612 requested for inputting/outputting; and a position in sequence. Similarly, the IO queue 660 is provided with the disk number of the magnetic disk 690; the number of held items; the IO command address of the IO command 613 requested for inputting/outputting; and a position in sequence.

FIG. 7 is a diagram illustrating the state before user A and user B request input/output processing; FIG. 8, a diagram illustrating the state after user A and user B have requested input/output processing; FIG. 9, a diagram illustrating the state after the completion of physical IO; FIG. 10, a diagram illustrating the state after user A has confirmed the completion of input/output; FIG. 11, a diagram illustrating the state after user B has confirmed the completion of input/output; FIG. 12, a diagram illustrating the state after physical IO has been performed in the state of FIG. 10; FIG. 13, a diagram illustrating the state after physical IO has been performed in the state of FIG. 11.

Next will be described the operation of the preferred embodiment of the invention with reference to FIGS. 7 to 13.

The following description refers to a case of processing in which users A and B are supposed to issue three and two input/output requests, respectively, to two magnetic disk units.

Referring to FIG. 7, user A's process 710 comprises three IO commands 712 to 714 and a local chain start 711 indicating a value of "−1" meaning the presence of no input/output request. User B's process 720 comprises two IO commands 722 and 723 and a local chain start 721 indicating a value of "−1" meaning the presence of no input/output request. In IO queues 730 and 740 respectively corresponding to the magnetic disk units 750 and 760, the number of held items in every IO queue is "0" indicating the absence of any address of an IO command to perform physical IO.

FIG. 8 illustrates the state following the state of FIG. 7 in which user A and user B have requested input/output processing. The input/output means, having received input/output requests by the IO commands 712 to 714, calls the local chain manipulating means and the IO queue incorporating means successively, and then the input/output means, having received input/output requests by the IO commands 722 and 723, calls the local chain manipulating means and the IO queue incorporating means successively.

The input/output means, having successively received the IO commands 712 to 714, incorporates with the local chain manipulating means the IO commands 712 to 714 into user A's local chain.

The local chain manipulating means, accepting the IO command 712, recognizes that user A's local start 711 is "−1" and that the chain is vacant, stores the address Al of the IO command 712 at the local chain start 711 in order to position the IO command 712 in the leading position of the chain, and stores "1" in the reserve position of the IO command 712.

Then the local chain manipulating means, accepting the IO command 713, recognizes user A's last IO command 712 from the fact that the local chain-is "−1", stores the address A2 of the IO command 713 into the local chain of the IO command 712 in order to position the IO command 713 next to the IO command 712, and stores "2" in the reserve position of the IO command 713.

Further the local chain manipulating means, accepting the IO command 714, recognizes user A's last IO command 713 from the fact that the local chain is "−1", stores the address A3 of the IO command 714 into the local chain of the IO command 713 in order to position the IO command 714 next to the IO command 713, and stores "3" in the reserve position of the IO command 714.

Next the IO queue incorporating means, referring to the disk number of the IO command 712, stores the address A1 of the IO command 712 into the IO queue 730 corresponding to the magnetic disk 750 indicated by the disk number D1 in a position whose sequential position is the number of items held in the IO queue 730 plus 1 to make the number of items held in the IO queue 730 "1".

The IO queue incorporating means, referring to the disk number of the IO command 713, stores the address A2 of the IO command 713 into the IO queue 740 corresponding to the magnetic disk 760 indicated by the disk number D2 in a position whose sequential position is the number of items held in the IO queue 740 plus 1 to make the number of items held in the IO queue 740 "1".

Further the IO queue incorporating means, referring to the disk number of the IO command 714, stores the address A3 of the IO command 714 into the IO queue 730 corresponding to the magnetic disk 750 indicated by the disk number D1 in a position whose sequential position is the number of items held in the IO queue 750 plus 1 to make the number of items held in the IO queue 750 "2".

The IO queue incorporating means, having similarly accepted the IO commands 722 and 723, incorporates with the local chain manipulating means the IO commands 722 and 723 into user B's local chain.

The local chain manipulating means accepts the IO command 722, recognizes that user B's local start 721 is "−1" and that the chain is vacant, stores the address B1 of the IO command 722 at the local chain start 721 in order to position the IO command 722 in the leading position of the chain, and stores "1" in the reserve position of the IO command 722.

Then the local chain manipulating means, accepting the IO command 723, recognizes user B's last IO command 722 from the fact that the local chain is "−1", stores the address B2 of the IO command 723 into the local chain of the IO command 722 in order to position the IO command 723 next to the IO command 722, and stores "2" in the reserve position of the IO command 723.

Next the IO queue incorporating means, referring to the disk number of the IO command 722, stores the address B1 of the IO command 722 into the IO queue 740 corresponding to the magnetic disk 760 indicated by the disk number D2 in a position whose sequential position is the number of items held in the IO queue 740 plus 1 to make the number of items held in the IO queue 740 "2".

Further the IO queue incorporating means, referring to the disk number of the IO command 723, stores the address B2 of the IO command 723 into the IO queue 730 corresponding to the magnetic disk 750 indicated by the disk number D1 in a position whose sequential position is the number of items held in the IO queue 730 plus 1 to make the number of items held in the IO queue 730 "3".

FIG. 9 is a diagram illustrating the state following the state of FIG. 8 in which the actual IO issuing means has taken out one IO command address each from the IO queues 730 and 740 and performed physical IO upon the respectively corresponding magnetic disks 750 and 760. The state of neither the local chain start nor the IO commands is changed.

The actual IO issuing means successively refers to the IO commands 712, 714 and 723 in the IO queue 730, respectively indicated by the IO command addresses of sequential positions 1 to 3 in FIG. 8; takes out of the IO queue 730 the IO command 712, first found from the IO commands having the earliest reserve positions; successively advances the IO command addresses whose sequential positions follow those taken out; and reduces the number of items held in the IO queue 730 by 1 to "2". Then it performs physical IO upon the magnetic disk 750 indicated by the disk number of the taken-out IO command 712.

Similarly, the actual IO issuing means successively refers to the IO commands 713 and 722 in the IO queue 740, respectively indicated by the IO command addresses of sequential positions 1 to 2; takes out of the IO queue 740 the IO command 722, first found from the IO commands having the earliest reserve positions; successively advances the IO command addresses whose sequential positions follow those taken out; and reduces the number of items held in the IO queue 740 by 1 to "1". Then it performs physical IO upon the magnetic disk 760 indicated by the disk number of the takenout IO command 722.

FIG. 10 illustrates the state following the state of FIG. 9 in which user A has entered a confirmation of the completion of inputting/outputting of the IO command 712.

The states of user B's local chain start 721, the IO commands 722 and 723, the IO queues 730 and 740, and the magnetic disks 750 and 760 are not changed.

The input/output means, having received a confirmation of input/output completion on the IO command 712 from user A, calls the local chain manipulating-means after the completion of physical IO on the IO command 712.

The local chain manipulating means, in order to separate the IO command 712 from user A's local chain, stores the value "A2" of the local chain of the IO command 712 into the local chain start 711 and "−1" into the local chain of the IO command 712. Then, while successively referring to IO commands, using the local chain, from the IO command 713 indicated by the value "A2" of the local chain start 711 until the value of the local chain becomes "−1", it stores the sequential positions referred to as reserve positions in IO commands, and the IO commands 713 and 714 take on reserve positions "1" and "2", respectively.

FIG. 11 illustrates the state following the state of FIG. 10 in which user B has entered a confirmation of the completion of inputting/outputting of the IO command 722.

The states of user A's local chain start 711, the IO commands 712 to 714, the IO queues 730 and 740, and the magnetic disks 750 and 760 are not changed.

The input/output means, having received a confirmation of input/output completion on the IO command 722 from user B, calls the local chain manipulating means after the completion of physical IO on the IO command 722.

The local chain manipulating means, in order to separate the IO command 722 from user B's local chain, stores the value "B2" of the local chain of the IO command 722 into the local chain start 721 and "−1" into the local chain of the IO command 722. Then, while successively referring to IO commands, using the local chain, from the IO command 723 indicated by the value "B2" of the local chain start 721 until the value of the local chain becomes "−1", it stores the sequential positions referred to as reserve positions in IO commands, and the IO command 723 takes on a reserve position "1".

FIG. 12 is a diagram illustrating the state following the state of FIG. 10 in which the actual IO issuing means has taken out one IO command address each from the IO queues 730 and 740 and performed physical IO upon the respectively corresponding magnetic disks 750 and 760. The state of neither the local chain start nor the IO commands is changed.

The actual IO issuing means successively refers to the IO commands 714 and 723 in the IO queue 730, respectively indicated by the IO command addresses of sequential positions 1 to 2; takes out of the IO queue 730 the IO command 714, first found from the IO commands having the earliest reserve positions; successively advances the IO command addresses whose sequential positions follow those taken out; and reduces the number of items held in the IO queue 730 by 1 to "1". Then it performs physical IO upon the magnetic disk 750 indicated by the disk number of the taken-out IO command 714.

Next the actual IO issuing means, as the number of held items in the IO queue 740 is "1", takes out of the IO queue 740 the IO command 713, whose sequential position is 1, to make the number of items held in the IO queue 740 "0". Then it performs physical IO upon the magnetic disk 760 indicated by the disk number of the taken-out IO command 713.

FIG. 13 is a diagram illustrating the state following the state of FIG. 11 in which the actual IO issuing means has taken out one IO command address each from the IO queues 730 and 740 and performed physical IO upon the respectively corresponding magnetic disks 750 and 760. The state of neither the local chain start nor the IO commands is changed.

The actual IO issuing means successively refers to the IO commands 714 and 723 in the IO queue 730, respectively indicated by the IO command addresses of sequential positions 1 to 2; takes out of the IO queue 730 the IO command 723, first found from the IO commands having the earliest reserve positions; successively advances the IO command addresses whose sequential positions follow those taken out; and reduces the number of items held in the IO queue 730 by 1 to "1". Then it performs physical IO upon the magnetic disk 750 indicated by the disk number of the taken-out IO command 714.

Next the actual IO issuing means, as the number of held items in the IO queue 740 is "1", takes out of the IO queue 740 the IO command 713, whose sequential position is 1, to make the number of items held in the IO queue 740 by 1 to "0". Then it performs physical IO upon the magnetic disk 760 indicated by the disk number of the taken-out IO command 713.

As hitherto described, the present invention has the benefit to provide an access control apparatus which can give equal input/output opportunities to input/output requests from all users by adopting as criterion of priority among input/output processing requests from all users the reserve sequence of reserved input/output requests, held for each individual user, and process the requests efficiently.

Although the invention has been described in detail above with reference to preferred embodiments thereof, it will be apparent to those skilled in the art that these embodiments have been provided solely for the purpose of illustration, and are in no way to be regarded as limiting the invention. Instead, various modifications and substitutions of equivalent techniques will be readily apparent to those skilled in the art upon reading this specification, and such modifications and substitutions are to be regarded as falling within the true scope and spirit of the following claims.

What is claimed is:

1. An access control method having plural users and plural auxiliary memory units, said method comprising the steps of:

adding priority information for each user to an input/output (IO) command entered by said each user for one of said auxiliary memory units and forming, for each user, a list of prioritized IO commands prioritized with respect to all IO commands associated with said each user;

storing a plurality of the prioritized IO commands in an IO queue corresponding to said one auxiliary memory unit;

issuing the plurality of prioritized IO commands of all of said users stored into said IO queue in a sequence of the priority information added to said prioritized IO command irrespective of who the entrant users are; and executing the plurality of prioritized IO commands.

2. An access control apparatus for controlling input/output (IO) access to a plurality of auxiliary memory devices by a plurality of users, the apparatus comprising:

an IO unit to enter IO commands from each of said plural users;

a local chain unit connected to said IO unit to receive said IO commands, to add to each of said IO commands a priority data value corresponding to an originating user of said each IO command, and to provide, for each of said plural users, a local chain of prioritized IO commands associated only with said each user; and a plurality of auxiliary memory device IO queues, each of said plural auxiliary memory devices corresponding to one of said auxiliary memory devices and each of said plural IO queues connected to said local chain unit to receive said prioritized IO commands from each of said plural users, wherein each IO queue issues IO commands for executing IO operations based on said priority data values.

3. The access control apparatus of claim 2, wherein said local chain unit further comprises a local chain address manipulating means for adding a new IO command to an end of a corresponding one of said local chains.

4. The access control apparatus of claim 3, wherein said local chain address manipulating means is further for deleting an IO command from said one local chain after execution of a corresponding IO command.

* * * * *